United States Patent [19]

Suzuki et al.

[11] Patent Number: 4,470,682
[45] Date of Patent: Sep. 11, 1984

[54] OPTICAL ELEMENT POSITIONING METHOD AND OPTICAL ELEMENT ASSEMBLY UTILIZING THE SAME

[75] Inventors: Masayuki Suzuki, Tokyo; Masayoshi Yamamichi, Kawasaki; Tsunemasa Ohara, Tokyo, all of Japan

[73] Assignee: Canon Kabushiki Kaisha, Tokyo, Japan

[21] Appl. No.: 411,971

[22] Filed: Aug. 26, 1982

[30] Foreign Application Priority Data

Sep. 7, 1981 [JP] Japan ................. 56-140660

[51] Int. Cl.³ ............. G03B 7/099; G03B 7/18; G02B 27/14
[52] U.S. Cl. ..................... 354/406; 354/479; 250/578; 350/173; 350/287
[58] Field of Search .............. 354/23 R, 25 R, 25 A, 354/25 P, 25 N, 31, 31 F, 59, 54–56, 219, 224, 225, 288, 406, 407, 429, 432, 476, 479; 350/171, 173, 287; 250/239, 578, 201; 356/4

[56] References Cited

U.S. PATENT DOCUMENTS

| | | | |
|---|---|---|---|
| 3,218,946 | 11/1965 | Lange | 354/54 |
| 3,218,948 | 11/1965 | Kuppenbender | 354/224 |
| 3,280,714 | 10/1966 | Gunther et al. | 354/55 |
| 3,464,337 | 9/1969 | Trankner | 354/56 |
| 3,630,134 | 12/1971 | Nakamura | 354/224 X |
| 3,872,484 | 3/1975 | Hashimoto et al. | 354/59 |
| 4,341,953 | 7/1982 | Sakai et al. | 354/25 X |
| 4,391,513 | 7/1983 | Fujiki | 354/25 |
| 4,404,595 | 9/1983 | Ushiro et al. | 354/25 X |

*Primary Examiner*—William B. Perkey
*Attorney, Agent, or Firm*—Fitzpatrick, Cella, Harper & Scinto

[57] ABSTRACT

Disclosed is an optical element positioning method in which a positioning part for determining the positions of a plurality of optical elements is formed in an optical element carrying member to accurately determine the relative position of the optical elements and the positioning part is utilized to mount the optical elements on the carrying member, and an optical element assembly utilizing such method.

13 Claims, 5 Drawing Figures

OPTICAL ELEMENT POSITIONING METHOD AND OPTICAL ELEMENT ASSEMBLY UTILIZING THE SAME

BACKGROUND OF THE INVENTION

1. Field of the Invention

This invention relates to an optical element positioning method for accurately determining the relative positional relation between a plurality of optical elements and to an optical element assembly utilizing such method.

The term "optical elements" used herein includes optical parts such as a lens, a prism, a mirror, etc. as well as radiation elements such as a photoelectric conversion element (radiation-responsive element-hereinafter referred to as a photoelectric sensor or a sensor), an electro-light conversion element (e.g., LED or the like), etc.

2. Description of the Prior Art

For example, a metering sensor or a range finding sensor heretofore used in a camera has been inserted in a mold part or a ceramic container and actually mounted in the camera. It has been extremely difficult to highly accurately determine the positional relation between these sensors and other optical elements or parts such as a lens, a prism, a mirror, etc. and for example, a method has been adopted which comprises adjusting and fixing them at the best position while measuring the sensor output when they are actually mounted in the camera. However, when the sensors are actually mounted in the camera, accidents such as breakage of lead wires have been liable to occur during position adjustment because the lead wire and a flexible print plate have been soldered in almost all cases, and moreover, much time has been required leading to a great inconvenience. Particularly, in the case of the distance detecting or range finding sensor, it has been necessary to dispose one or more range finding or focus detecting optical parts in the optical path between the sensor and a picture-taking lens and high accuracy has been required to determine the relative position of the optical part or parts and the range finding sensor and therefore, position adjustment has been very complex and has required considerable skill.

SUMMARY OF THE INVENTION

In view of the above-noted situation, the present invention has as its primary object the provision of a novel and advantageous optical element positioning method which can eliminate all of the above-noted inconveniences peculiar to the prior art and an optical element assembly utilizing such method.

It is another object of the present invention to provide an optical element positioning method which simply predetermines the positions of optical elements outside an optical instrument by the use of a very simple means and facilitates the actual mounting of the optical elements onto the optical instrument and an optical element assembly utilizing such method.

Under such objects, according to the present invention, there is provided an optical element positioning method in which positioning means for positioning a plurality of optical elements is formed on an optical element carrying member to accurately determine the relative position of the optical elements and the positioning means is utilized to fix the optical elements to the carrying member and an optical element assembly utilizing such method.

It is still another object of the present invention to provide an optical element positioning method particularly suitable for the relative positioning between a photoelectric or electro-light conversion sensor and an optical part such as a lens, a prism, a mirror or the like and an optical element assembly utilizing such method.

Thus, according to a preferred embodiment of the present invention which will hereinafter be described, there is provided an optical element positioning method in which a sensor package containing the sensor therein is caused to bear against a restraining portion provided on one surface of the optical element carrying member and the sensor package is fixed to said surface of the carrying member and wherein a hole is formed in a portion of the carrying member to which the sensor package is opposed and the end surface of the hole is used as a restraining portion to cause an optical part to bear thereagainst and the optical part is fixed to the hole, thereby determining the relative position of the sensor and the optical part, and an optical element assembly utilizing such method.

Other objects and features of the present invention will become apparent from the following detailed description thereof taken in conjunction with the accompanying drawings.

BRIEF DESCRIPTION OF THE DRAWINGS

A preferred embodiment of the present invention will hereinafter be described with reference to the accompanying drawings, in which.

DESCRIPTION OF THE PREFERRED EMBODIMENT

Figure 1:
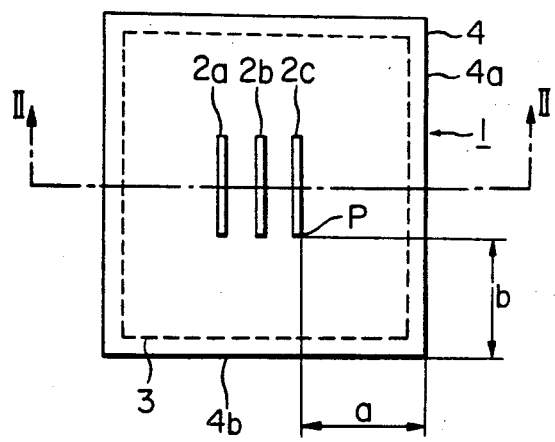
FIG. 1 is a plan view of a sensor package to be mounted on a camera.
Figure 2:
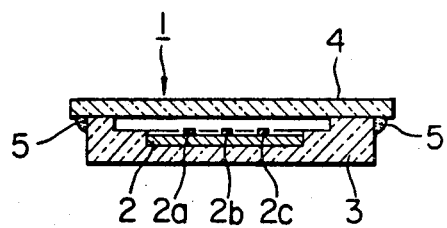
FIG. 2 is a cross-sectional view taken along line II—II in FIG. 1.

Referring to FIGS. 1 and 2, reference numeral 1 designates a range finding sensor package to be mounted to a camera. The sensor package 1 has a sensor chip (IC chip) 2 such as CCD in which three radiation sensing sections for range finding, for example, sensor arrays 2a, 2b and 2c are formed at predetermined intervals. The sensor chip 2 is inserted and fixed in a ceramic package 3. The reference sides 4a and 4b of a protective glass plate 4 are positioned so as to lie at predetermined distances a and b from a reference position P corresponding to one end of the rightmost sensor array 2c, and the ceramic package 3 and the protective glass plate 4 are bonded together by an adhesive agent 5.

Figure 3:
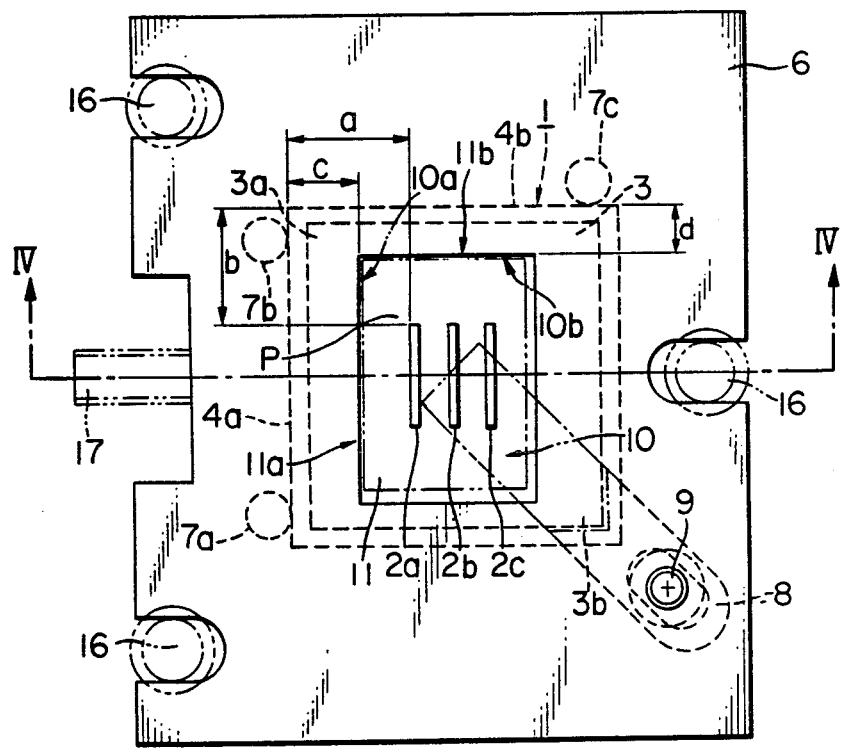
FIG. 3 is a plan view of the sensor package as fixed to an optical element carrying member.
Figure 4:
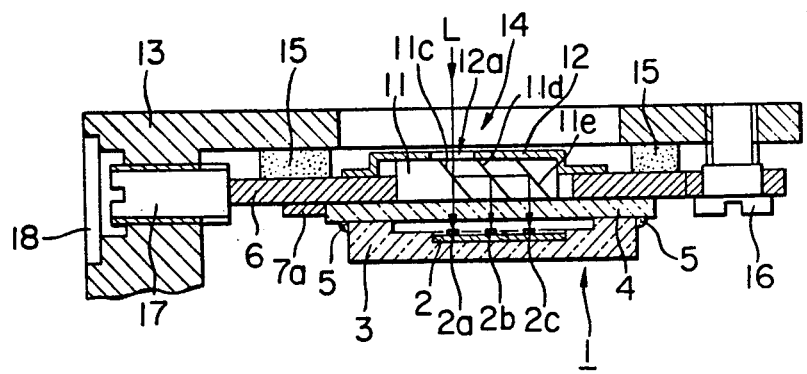
FIG. 4 is a cross-sectional view corresponding to the cross-section IV—IV, in FIG. 3 and showing the carrying member as actually mounted on a camera body, the carrying member having optical elements mounted thereon.

The sensor package 1, as shown in FIG. 3, is accurately fixed to the back of a plate-like optical member carrying member 6. That is, three positioning projections 7a, 7b and 7c are projected on the back of the carrying member 6, and the reference side 4a of the protective glass plate 4 bears against the projections 7a and 7b and the reference side 4b of the protective glass plate 4 bears against the projection 7c. The corner portion 3b of the ceramic package 3 which is opposite to a corner portion 3a near the projection 7b is pressed in a diagonal direction relative to the projections 7a-7c and toward the back of the carrying member 6 by a pressing member 8 and a fixing screw 9 and thus, the sensor package 1 is fixed to the carrying member 6. A rectangular hole 10 havng two reference end surfaces 10a and 10b is formed in a predetermined portion of the carrying member 6 to which the sensor package 1 is opposed, the reference end surface 10a being parallel to the reference side 4a of the protective glass plate 4 with a distance c interposed therebetween, and the reference end surface 10b being parallel to the reference side 4b with a distance d interposed therebetween. As indicated by an imaginary line, a rectangular optical prism 11 is inserted in the rectangular hole 10, and the two end surfaces 11a and 11b of the optical prism 11 are positioned while bearing against the reference end surfaces 10a and 10b of the rectangular hole 10. As shown in FIG. 4, the optical prism 11 is provided with a semitransmittal mirror portion 11c transmitting about one-third of incident light and reflecting the remainder of the incident light, a semitransmittal mirror portion 11d transmitting about one-half of the incident light and reflecting the remainder of the incident light, and a total reflection mirror portion 11e reflecting all of the incident light. A fixing member 12 serving also as a mask having an opening 12a is affixed to the optical prism 11 in such a manner that the opening 12a matches the semitransmittal mirror portion 11c, and the optical prism 11 is fixed to the carrying member 6 by this fixing member 12.

By accurately forming the projections 7a, 7b and 7c and reference end surfaces 10a and 10b of the carrying member 6 as per the design, the positioning of the sensor package 1 and optical prism 11 utilizing these can be accurately accomplished relative to the carrying member 6. Accordingly, the relative positional relation between the sensor package 1 and the optical prism 11, namely, the relative positional relation between the sensor arrays 2a, 2b, 2c of the sensor chip 2 and the mirror portions 11c, 11d, 11e of the prism 11, is necessarily determined accurately.

The carrying member 6 in which the sensor package 1 and the optical prism 11 are mounted in a predetermined positional relationship in this manner, namely, the optical element assembly including the package 1, prism 11 and carrying member 6, as shown in FIG. 4, is fixed to a portion 13 of the camera body (specifically, to a bottom base plate constituting the mirror box of the single lens reflex camera body as will be described later with reference to FIG. 5) from the back thereof. That is, the optical prism 11 is fixed by three screws 16 through an adjusting washer 15 after having been positioned by an adjusting screw 17 so that it lies below the light-transmitting opening 14 of a portion of the camera body. Designated by 18 is a lid which covers the screw 17.

Thus, the position of the carrying member 6 is adjusted and determined by the use of the adjusting screw 17 with the screw 16 as the guide and then the carrying member 6 is fixed, whereby a light beam L passed through the light-transmitting opening 14 of a portion 13 of the camera body enters the optical prism 11 through the opening 12a of the fixing member 12 and is divided into three light beams by the mirror portions 11c-11e of the optical prism 11, and the respective light beams are accurately incident on the sensor arrays 2a, 2b and 2c of the sensor chip 2. The reason why the light beams can thus be accurately incident on the sensor arrays 2a, 2b and 2c of the sensor chip 2 substantially without requiring adjustment is that the elements (the sensor and prism) are caused to bear against the restraining portion of the optical element carrying member 6 outside the camera body in advance by the use of the optical element carrying member 6, thereby accurately accomplishing the positioning.

Figure 5:
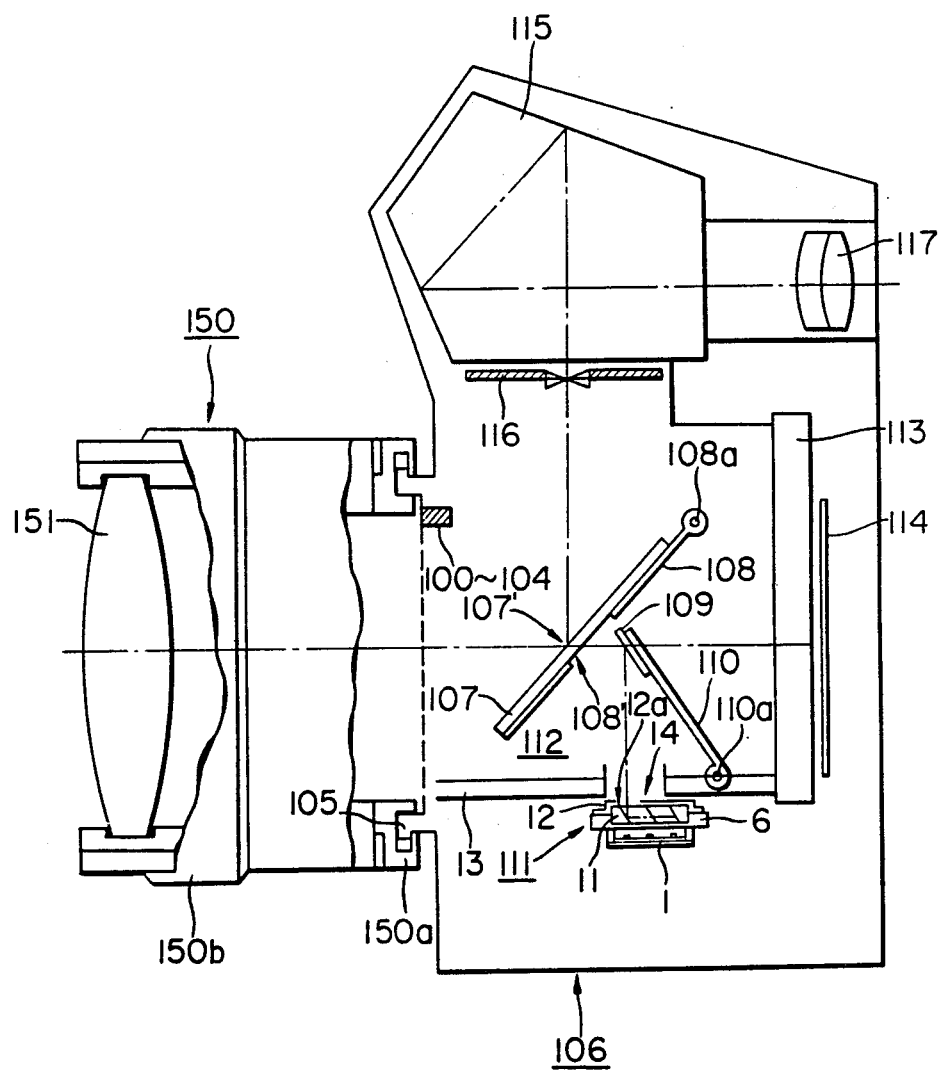
FIG. 5 is a model view chiefly showing the positional relation between the carrying member with the optical elements mounted thereon incorporated in the camera body as shown in FIG. 4 and the optical system of the camera.

The optical element assembly including the sensor package 1, the optical prism 11 and the carrying member 6 is fixed at a position suitable for the purpose of detecting the focus of a picture-taking lens, for example, in a single lens reflex camera body, more specifically, to the back of the bottom base plate constituting the mirror box of the camera body, as shown in FIG. 5.

In FIG. 5, a photographic lens assembly 150 has a clamp ring 150a for coupling the lens assembly with the mounting part on the camera body side, and a focusing ring 150b for manually focusing a photographic optical system 151. A camera body 106 has a mount (lens mount) 105 for mounting thereon the photographic lens assembly 150. A quick return mirror 107 of a known configuration is a semitransparent mirror which has a suitable transmissivity at a part indicated by 107' or of the entirety. The quick return mirror 107 is supported by a support member 108 which pivots about a shaft 108a. The support member 108 has an opening 108' for allowing transmission of part of the incident light. A submirror 109 serves to downwardly deflect the transmitted light ray and is supported on a support member 110 pivotable about a shaft 110a. The optical element assembly including the sensor package 1, the optical prism 11 and the carrying member 6 is designated by 111 in FIG. 5 and, as shown, it is disposed on the back of the bottom base plate 13 constituting the mirror box 112 of the camera so as to be opposed to the opening 14 thereof. The reflected light from the submirror 109 enters the thus disposed optical element assembly 111 through the opening 14 of the base plate 13. This incident light beam enters the prism 11 through the opening 12a of the fixing member 12 in the assembly 111, as previously described, and is divided into three light beams by the prism 11, and the respective light beams enter the sensor arrays 2a-2c of the sensor chip in the sensor package 1. The positional adjustment of the submirror 109 relative to the optical axis when the assembly 111 is disposed can be accomplished by the use of the adjusting screw of FIG. 4, as previously described. The camera body 106 further includes a known shutter 113, a film 114, a pentaprism 115, a focus plate 116 and an ocular lens 117.

Incidentally, the construction of the above-described embodiment is particularly suitable for the focus detecting system disclosed as an embodiment in U.S. patent application Ser. Nos. 310,373 and 310,483 filed on Oct. 9, 1981 and U.S. patent application Ser. Nos. 313,578; 313,579; 313,582; 313,584 and 313,599 and U.S. Pat. No. 4,411,504 dated Oct. 25, 1983, all filed on Oct. 21, 1981, of the same assignee of the subject application.

In the embodiment shown, the optical elements to be positioned are the range finding sensor package 1 and the optical prism, but the present invention is also effective where a combination of a metering sensor package and a lens or three or more optical elements are to be positioned. The carrying member is not restricted to a plate-like member but may of course take a cubic form, for example. Further, the present method can also be utilized in other optical instruments than cameras.

As has hitherto been described, the optical element positioning method according to the present invention and the optical element assembly utilizing the same determine a predetermined positional relation simply by providing the carrying member with a restraining portion and causing a plurality of optical elements to bear against the restraining portion, whereafter the carrying member having the optical elements thus mounted thereon is actually mounted in an optical instrument and therefore, the procedure of adjustment becomes nearly unnecessary and the process required for the adjustment or any error which may occur during the adjustment can be reduced, and this is highly beneficial.

What we claim is:

1. An optical device having a body and including:
   (A) an optical system receiving a light from outside said body and passing at least part of said light therethrough;
   (B) an optical element assembly for receiving the light from said optical system, said assembly including:
      (B-1) a carrying member for carrying a plurality of optical elements, said carrying member having positioning means for positioning said optical elements; and
      (B-2) a plurality of optical elements positioned and mounted on said carrying member by utilization of said positioning means;
   (C) support means for supporting said optical element assembly; and
   (D) adjusting means for position-adjusting said optical element assembly relative to said support means;
   said carrying member in said optical element assembly having a flat surface and a through-hole formed in said surface, a first one of said plurality of optical elements being positioned and mounted on said surface of said carrying member by utilization of the positioning means on said surface so as to be opposed to said hole, and a second one of said plurality of optical elements being mounted in said hole of said carrying member by utilizing a part of the inner edge of said hole as the positioning means.

2. An optical device according to claim 1, wherein said optical element assembly further includes:
   first fixing means for fixing said first optical element to said surface of said carrying member; and
   second fixing means for fixing said second optical element to said hole of said carrying member.

3. An optical device according to claim 1 or 2, wherein said first optical element is a light-responsive element and said second optical element is an optical part for causing the light from said optical system to enter said light-responsive element.

4. An optical device according to claim 3, wherein said light-responsive element has a plurality of independent light-responsive sections and said optical part has a plurality of light-distributing sections for dividing the light from said optical system into a plurality of lights and causing the divided lights to enter the respective ones of said light-responsive sections.

5. An optical device according to claim 4, wherein said optical part is a light-dividing prism.

6. An optical device according to claim 1, wherein said adjusting means contacts said optical element assembly and comprises an adjusting member for adjusting the relative position thereof with respect to said support means.

7. An optical device to be used in a camera, comprising:
   (A) reflecting means for reflecting a part of the light incident from a camera lens to direct it in a direction different from a direction to a finder-optical system;
   (B) an optical element assembly arranged in a position to which the reflected light is directed, said assembly including:
      (B-1) a carrying member for carrying a plurality of optical elements, said carrying member having positioning means for positioning said optical elements; and
      (B-2) a plurality of optical elements positioned and mounted on said carrying member by utilization of said positioning means;
   (C) support means for supporting said optical element assembly; and
   (D) adjusting means for position-adjusting said optical element assembly relative to said support means.

8. An optical device to be used in a camera according to claim 7 wherein said first optical element is a light-responsive element and said second optical element is an optical part for causing the reflected light from said reflecting means to enter said light-responsive element.

9. An optical device to be used in a camera according to claim 8, wherein said light-responsive element has a plurality of independent light-responsive sections and said optical part has a plurality of light-distributing sections for dividing the light from said optical system into a plurality a light paths and causing the light paths to enter respective ones of said light-responsive sections.

10. An optical device to be used in a camera according to claim 9, wherein said optical part is a light-dividing prism.

11. An optical device to be used in a camera according to claim 7, wherein said support means comprises a portions of a camera body.

12. An optical device to be used in a camera according to claim 11, wherein an aperture is formed in said portion of said support means, and said optical element assembly is arranged on the back surface of the portion of the camera body in position opposite to said aperture.

13. An optical device to be used in a camera according to claim 7, wherein the position in which the light beam reflected by said reflecting means enters said optical element assembly is adjustable by said adjusting means.

* * * * *